United States Patent
Morikawa (10) Patent No.: US 7,276,005 B2
(45) Date of Patent: Oct. 2, 2007

(54) WHEEL DRIVE SYSTEM FOR INDEPENDENTLY DRIVING RIGHT AND LEFT WHEELS OF VEHICLE

(75) Inventor: Kunihiko Morikawa, Kanagawa (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 202 days.

(21) Appl. No.: 10/960,109

(22) Filed: Oct. 8, 2004

(65) Prior Publication Data

US 2005/0124451 A1 Jun. 9, 2005

(30) Foreign Application Priority Data

Oct. 14, 2003 (JP) .............................. 2003-353200

(51) Int. Cl.
*F16H 1/28* (2006.01)
*B60K 1/02* (2006.01)

(52) U.S. Cl. ......................................... 475/5; 180/65.6

(58) Field of Classification Search ................ 180/372, 180/65.1, 65.2, 65.3, 65.5, 65.6; 310/112, 310/113, 114, 266; 475/149, 151, 5, 6
See application file for complete search history.

(56) References Cited

U.S. PATENT DOCUMENTS 6,373,160 B1* 4/2002 Schrodl ...................... 310/114

2003/0010547 A1* 1/2003 Wachauer .................. 180/65.1

FOREIGN PATENT DOCUMENTS

JP 9-79348 A 3/1997

* cited by examiner

*Primary Examiner*—Dirk Wright
*Assistant Examiner*—Derek D. Knight
(74) *Attorney, Agent, or Firm*—Foley & Lardner LLP

(57) ABSTRACT

A wheel drive system for independently driving right and left wheels of a vehicle is disposed between right and left wheels of the vehicle, and is comprised of a coaxial three-layer motor which includes an inner rotor, an outer rotor and a stator which are coaxially arranged; a first planetary gear reduction mechanism whose input is connected to the inner rotor, and whose output is connected to a first drive shaft of one of right and left wheels; and a second planetary gear reduction mechanism whose input is connected to the outer rotor and whose output is connected to a second drive shaft of the other of the right and left wheels. A reduction ratio of the first planetary gear reduction mechanism is greater than a reduction ratio of the second planetary gear reduction mechanism.

9 Claims, 4 Drawing Sheets

WHEEL DRIVE SYSTEM FOR INDEPENDENTLY DRIVING RIGHT AND LEFT WHEELS OF VEHICLE

BACKGROUND OF THE INVENTION

The present invention relates a wheel drive system for independently driving right and left wheels of a vehicle, and more particularly to a wheel drive system which is adapted to an electric vehicle or fuel cell vehicle.

Japanese Published Patent Application No. 9-79348 discloses a pair of differential gearsets each of which comprises first, second and third rotation elements, and is connected to each of right and left wheels. An electric motor is connected to each first element, and each of right and left wheels is connected to each second element, and each brake means for restraining the rotation of each wheel is connected to each third element.

SUMMARY OF THE INVENTION

However, this system is arranged such that the two motors are attached to right and left wheels, respectively and that a motor axis of each motor is disposed parallel to a shaft of each differential device. Therefore, if the two motors are disposed at a vehicle front portion and a vehicle rear portion respectively so as to sandwich a differential device axis, the system is enlarged in the front and rear direction of the vehicle. If the two motors are disposed at a vehicle upper portion and a vehicle lower portion respectively so as to sandwich a differential device axis, the system is enlarged in the upper and lower direction of the vehicle. That is, when this system is installed in a vehicle, the system requires a large necessary space to degrade in compactness. Additionally, this system requires two parallel shaft gears and two planetary gearsets for right and left wheels. Therefore, this system has a problem that the quietness is degraded due to the increase of gear noise generation sources.

It is therefore an object of the present invention to provide a wheel drive system of independently driving right and left wheels of a vehicle, which system is capable of ensuring both of a high vehicle installation ability by improving its compactness and a quietness by suppressing gear noises.

An aspect of the present invention resides in a wheel drive system for independently driving right and left wheels of a vehicle. The wheel drive system is disposed between right and left wheels of the vehicle. The wheel drive system comprises a coaxial three-layer motor comprising an inner rotor, an outer rotor and a stator which are coaxially arranged, the coaxial three-layer motor being housed in a motor case; a first planetary gear reduction mechanism whose input is connected to the inner rotor and whose output is connected to a first drive shaft of one of right and left wheels; and a second planetary gear reduction mechanism whose input is connected to the outer rotor and whose output is connected to a second drive shaft of the other of the right and left wheels. A reduction ratio of the first planetary gear reduction mechanism is greater than a reduction ratio of the second planetary gear reduction mechanism.

The other objects and features of this invention will become understood from the following description with reference to the accompanying drawings.

DETAILED DESCRIPTION OF THE INVENTION

Hereinafter, there is discussed a wheel drive system for independently driving right and left wheels of a vehicle according to the present invention, with reference to the drawings showing first through sixth embodiments thereof.

FIRST EMBODIMENT

Figure 1:
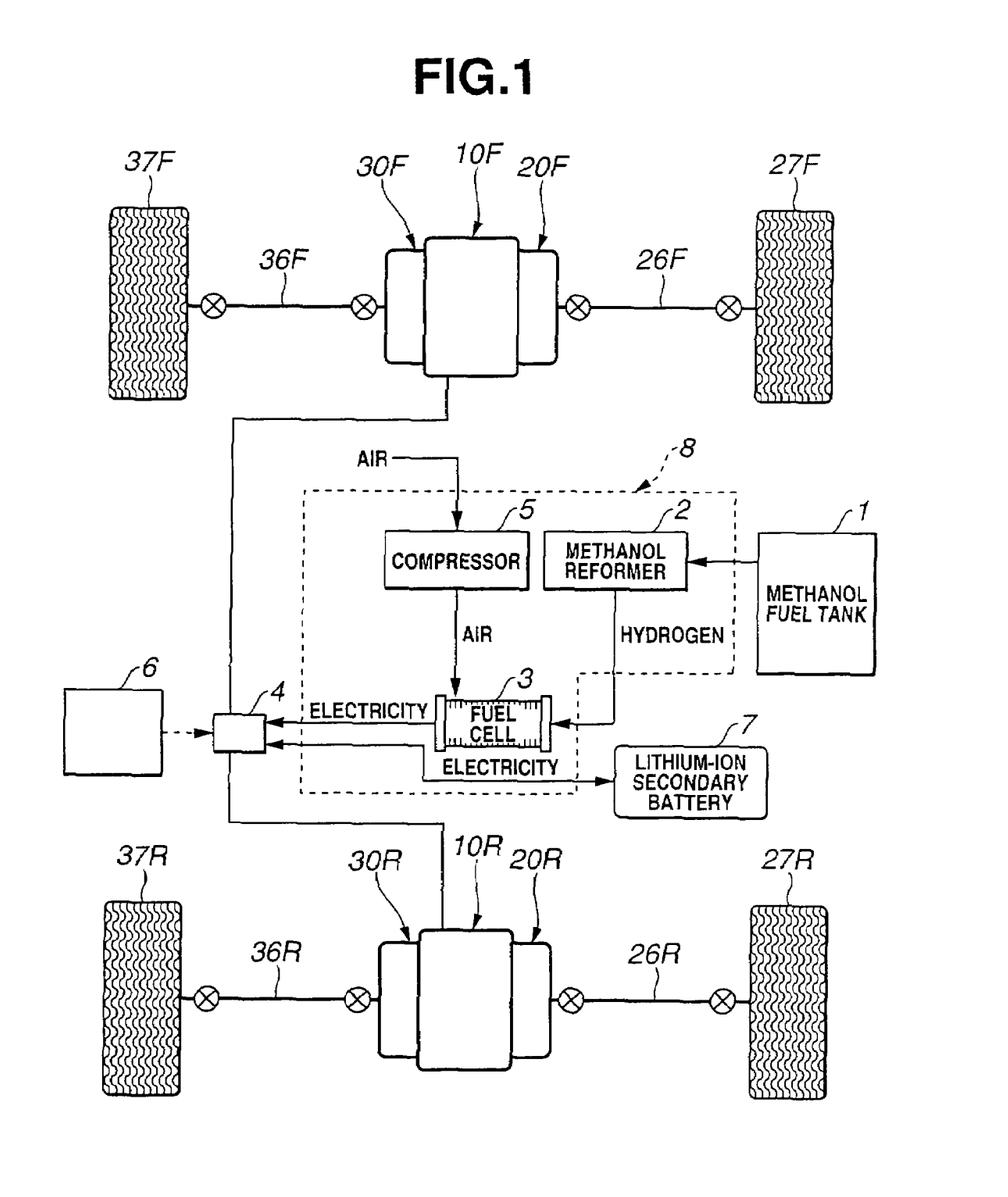
FIG. 1 is a system view showing a fuel cell vehicle which employs a wheel drive system of a first embodiment according to the present invention.
Figure 2:
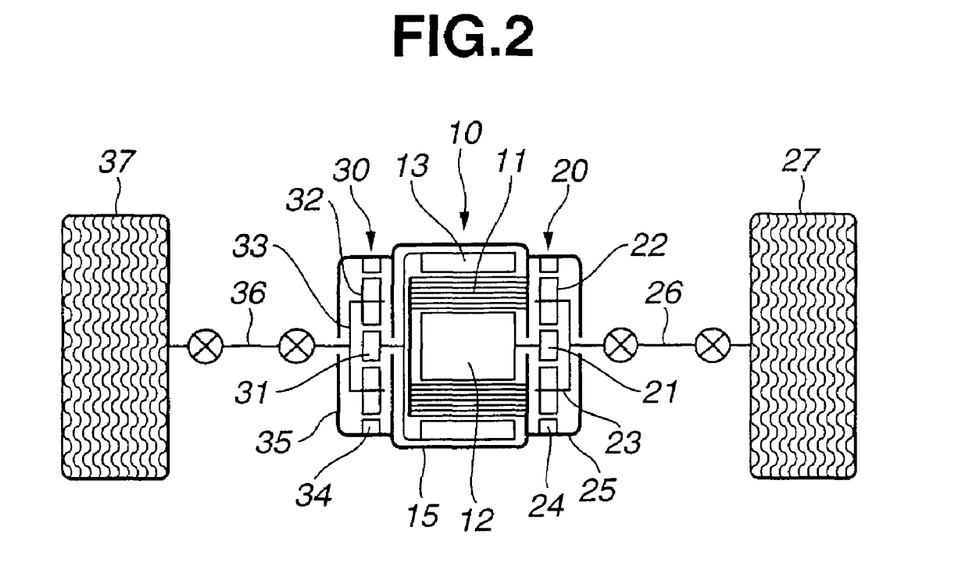
FIG. 2 is a cross-sectional view showing the wheel drive system of the first embodiment.

Referring to FIGS. 1 and 2, there is discussed a first embodiment of the wheel drive system according to the present invention. As shown in FIG. 1, a fuel cell vehicle employs the wheel drive system for a vehicle of a first embodiment according to the present invention. The wheel drive system is disposed between front right and left wheels 27F and 37F and between rear right and left wheels 27R and 37R. A front wheel drive system of the wheel drive system comprises a coaxial three-layer motor 10F, a first planetary gear reduction mechanism 20F, a second planetary gear reduction mechanism 30F, a first drive shaft 26F and a second drive shaft 36F. Similarly, a rear wheel drive system of the wheel drive system comprises a coaxial three-layer motor 10R, a first planetary gear reduction mechanism 20R, a second planetary gear reduction mechanism 30R, a first drive shaft 26R and a second drive shaft 36R.

Further as shown in FIG. 1, a fuel cell system for applying motor drive current to coaxial three-layer motors 10F and 10R is arranged to extract hydrogen by reacting fuel methanol stored in a methanol fuel tank 1 with water in a methanol reformer 2. The fuel cell system generates electricity by reacting the hydrogen with oxygen in a fuel cell 3 and supplies the electricity through an inverter 4 for converting electric power from direct current (DC) electricity to alternating current (AC) electricity to coaxial three-layer motors 10F and 10R to drive the motors 10F and 10R. Fuel cell 3 is of a pressure type in which fuel gas and air are pressurized and supplied into fuel cell 3, and therefore fuel cell 3 further comprises a compressor 5 for generating pressurized air. Inverter 4 operates in response to a command from a power control unit 6 for controlling the operations of coaxial three-layer motors 10F and 10R. The fuel cell system further comprises a lithium ion secondary battery 7 in order to cover the insufficiency of the starting performance of fuel cell 3. A fuel cell power unit 8 is constructed by methanol reformer 2, fuel cell 3 and compressor 5, as surrounded by a broken line in FIG. 1.

FIG. 2 is a cross sectional view showing the wheel drive system of the first embodiment according to the present invention. Since the wheel drive system disposed between front right and left wheels 27F and 37F is the same as that disposed between rear right and left wheels 27R and 37R, there is explained the right and left wheel drive system by omitting the references F and R from the references.

Coaxial three-layer motor 10 has an appearance of one motor, but has a function of two motor/generators. This multi-axis multi-layer motor 10 is housed in a motor case, and comprises a stator 11 which is fixed to the motor case and which functions as a coiled stationary armature, an inner rotor 12 in which permanent magnets are imbedded and which is disposed inside the stator 11, and an outer rotor 13 in which permanent magnets are imbedded and which is disposed outside the stator 11.

In inner rotor 12 a plurality of permanent magnets are imbedded along an axial direction of inner rotor 12. More specifically, twelve permanent magnets are imbedded in inner rotor 12 along the axial direction of inner rotor 12 and are arranged into six pairs of magnets so that each pair of the magnets performs the same polarity, and therefore inner rotor 12 is constructed into three pole pairs.

In outer rotor 13 a plurality of permanent magnets are similarly imbedded along an axial direction of outer rotor 13. More specifically, twelve permanent magnets are imbedded in outer rotor 13 along the axial direction of outer rotor 13, and the polarities of the arranged magnets are alternately changed one by one, and therefore outer rotor 13 is constructed into six pole pairs.

Stator 11 is constructed by circumferentially arranging a plurality of stator teeth which are constructed by winding coils on laminated steel plates. More specifically, eighteen coils are circumferentially arranged so as to form six phase coil three times. A compound current produced by three-phase alternating current and six-phase alternating current is applied to this coil of stator 11. By this compound current, it becomes possible to independently control inner rotor 12 of a three-phase drive and outer rotor 13 of a six-phase drive.

First planetary gear reduction mechanism 20 receives the rotational power of inner rotor 12 as an input, and outputs the rotational power to first drive shaft 26 as an output. First planetary gear reduction mechanism 20 is a simple planetary gearset which comprises a sun gear 21, pinions 22 meshed with sun gear 21, a pinion carrier 23 of supporting pinions 22, and a ring gear 24 meshed with pinions 22. Sun gear 21 is connected to an output shaft of inner rotor 12, ring gear 24 is fixed to a reducer case 25, and pinion carrier 23 is connected to wheel 27 through first drive shaft 26.

Second planetary gear reduction mechanism 30 receives the rotational power of outer rotor 13 as an input, and outputs the rotational power to second drive shaft 36 as an output. Second planetary gear reduction mechanism 30 is also a simple planetary gearset which comprises a sun gear 31, pinions 32 meshed with sun gear 31, a pinion carrier 33 of supporting pinions 32, and a ring gear 34 meshed with pinions 32. Sun gear 31 is connected to an output shaft of outer rotor 13, ring gear 34 is fixed to a reducer case 35, and pinion carrier 33 is connected to wheel 37 through second drive shaft 36.

When gears 21, 31, 24 and 34 are set such that the number of teeth of sun gear 21 is $Z21$, the number of teeth of sun gear 31 is $Z31$, the number of teeth of ring gear 24 is $Z24$ and the number of ring gear 34 is $Z34$, a reduction ratio (speed reducing ratio) $i20$ of first planetary gear reduction mechanism 20 and a reduction ratio (speed reducing ratio) $i30$ of second planetary gear reduction mechanism 30 are given by the following expressions (1) and (2).

$$i20 = (1+\lambda 20)/\lambda 20 \text{ where } \lambda 20 = Z21/Z24. \quad (1)$$

$$i30 = (1+\lambda 30)/\lambda 30 \text{ where } \lambda 30 = Z31/Z34. \quad (2)$$

By setting the relationship between the number of teeth of sun gear 21 and the number of teeth of sun gear 31 at $Z21 > Z31$ and by setting the relationship between the number of teeth of ring gear 24 and the number of teeth of ring gear 34 at $Z24 > Z34$, the reduction ratio $i20$ of first planetary gear reduction mechanism 20 is set to be greater than the reduction ratio $i30$ of second planetary gear reduction mechanism 30.

Further, the number of teeth of ring gear 24 of first planetary gear reduction mechanism 20 and the number of teeth of ring gear 34 of second planetary gear reduction mechanism 30 have a relationship that a difference of the number $Z24$ and the number $Z34$ is greater than or equal to 3 ($|Z24-Z34| \geq 3$).

Subsequently there is discussed the manner of operation of the wheel drive system according to the first embodiment of the present invention.

[Equivalency between Drive Torques]

Coaxial three-layer motor 10 has a merit of functioning as two motor/generators although it is appeared as one motor. However, the output characteristic of inner rotor 12 is a high-speed and low-torque characteristic, and the output characteristic of outer rotor 13 is a low-speed and high-torque characteristic.

Therefore, if the reduction ratios of planetary gear reduction mechanisms 20 and 30 for right and left wheels are set at the same ratio, the difference between the output characteristics of inner and outer rotors affect the characteristic of the drive torques of right and left wheels. For example, there may cause a difference of the right and left drive torques such that a transfer drive torque to the wheel connected to inner rotor is low and a transfer drive torque to the wheel connected to outer rotor is high.

In contrast to this, since the first embodiment according to the present invention is arranged such that the reduction ratio $i20$ of first planetary gear reduction mechanism 20 is greater than the reduction ratio $i30$ of second planetary gear reduction mechanism 30, the transfer drive torque of a wheel, which is connected to inner rotor 12 rotatable at high speed, is largely reduced by first planetary gear reduction mechanism 20 so as to obtain a performance of torque increase by a large torque width. Further, the transfer drive torque of a wheel connected to outer rotor 13 is reduced in small degree by second planetary gear reduction mechanism 30 so as to obtain a performance of torque increase by a small torque width.

As a result, the torque difference of the right and left drive torques is corrected, and therefore there is obtained the equivalency between the drive torque of the wheel connected to inner rotor 12 and the drive torque of the wheel connected to outer rotor 13.

[Compactness]

In case of the prior art disclosed in the background of the invention, the known drive system employs two motors, and therefore the known drive system has a layout of projectedly disposing two motors around a pair of differential devices. This degrades the degree of freedom of a layout of installing the system on a vehicle and decreases a vehicle occupant space.

In contrast to this, since the wheel drive system of the first embodiment according the present invention employs a coaxial three-layer motor which appears as a motor while having a function of two independent motors, it becomes possible to achieve a high vehicle installation ability. More specifically, as shown in FIGS. 1 and 2, coaxial three-layer motor 10 and first and second planetary gear reduction mechanisms 20 and 30 and first and second drive shafts 26 and 36 are compactly arranged on one axial line. Therefore, the wheel drive system of the first embodiment requires a small space and has a high degree of freedom of layout in the vehicle. Therefore, the wheel drive system according to the present invention can sufficiently ensure an occupant space and other space for other devices. That is, the wheel drive system of the first embodiment according to the present invention achieves the high installation ability.

[Quietness]

In case of the prior art disclosed in the background of the invention, the known drive system is arranged to supply each drive input of each of two motors to each of a pair of differential devices through two parallel-arranged gears, respectively. That is, both of the differential devices and the parallel arranged gears function as a gear noise generating source. Therefore, it is difficult to ensure a high quietness of this known drive system since there are many gear noise generating sources therein.

In order to ensure a high quietness of this known drive system, it is necessary to cover this known drive system with a sound-damping cover or to use a power-unit mount of performing a high vibration attenuating performance. Such an additional arrangement degrades the compactness of the drive system, and generates a demerit in cost due to the increase of the number of parts.

In contrast to this, the wheel drive system of the first embodiment according to the present invention does not use the parallel-arranged gears employed in the prior art, and therefore the gear noise generating source is only first and second planetary gear reduction mechanisms 20 and 30. Therefore, it becomes possible to ensure a higher quietness of the wheel drive system by suppressing the generation of vibration noises since there are fewer gear noise generating sources.

Further, there is known a noise reduction method of a planetary gearset for properly selecting the number of teeth of a sun gear, the number of teeth of a ring gear and the number of pinion gears. Therefore, it is possible to decrease the gear noise of the planetary gearset employed in the wheel drive system of the first embodiment according to the present invention by the application of the noise reduction method of reducing the gear noise of a planetary gearset.

Further, the first embodiment according to the present invention is arranged such that a difference between the number Z24 of teeth of ring gear 24 and the number Z34 of teeth of ring gear 34 is greater than or equal to 3, it is possible to prevent the amplitude of a vibration generating force and the generation of beat phenomenon.

More specifically, when the vehicle normally runs straightly, right and left wheels 27 and 37 rotate at the same speed. Accordingly, carriers 23 and 33, which are the output shafts of first and second planetary gear reduction mechanisms 20 and 30, also rotate around ring gears 24 and 34 at the same speed, respectively. When the numbers of the respective teeth of ring gears 24 and 34 are Z24 and Z34, the orders of the gear noises are Z24 order and Z34 order of the respective output shaft rotation speeds, and therefore the vibration generating force becomes twice as much. When the difference of the numbers of the respective teeth of ring gears 24 and 34 are 1 or 2, there is a possibility that the beat phenomenon of the first order or second order of the rotation speed is generated. Accordingly, by setting the difference of the numbers Z24 and Z34 of the teeth of ring gears 24 and 34 to be greater than or equal to 3, the amplitude of the vibration generating force and the generation of the beat phenomenon are prevented. Therefore, the quietness of the wheel drive system of the first embodiment according to the present invention is improved.

Subsequently, there is discussed the advantages of the wheel drive system of the first embodiment according to the present invention. The wheel drive system of the first embodiment according to the present invention gains the following advantages (1), (2) and (3).

(1) The wheel drive system, which is disposed between the front right and left wheels 27F and 37F and between the rear right and left wheels 27R and 37R and which comprises an electric motor and a planetary gear reduction mechanism, is arranged such that a coaxial three-layer motor constructed by coaxially arranging an inner rotor 12, outer rotor 13 and stator 11 is used as the motor/generators, and the planetary gear reduction mechanism is constructed by first planetary gear reduction mechanism 20 in which inner rotor 12 is an input and first drive shaft 26 is an output, and second planetary gear reduction mechanism 30 in which outer rotor 13 is an input and second drive shaft 36 is an output. Further, reduction ratio i20 of first planetary gear reduction mechanism 20 is set to be greater than reduction ratio i30 of second planetary gear reduction mechanism 30. Therefore, the wheel drive system of the first embodiment according to the present invention achieves a high vehicle installation performance requiring a small necessary space and a high quietness suppressing the generation of vibration noises.

(2) The wheel drive system of the first embodiment according to the present invention is arranged such that each of first and second planetary gear reduction mechanisms 20 and 30 is constructed by a simple planetary gearset which comprises sun gear 21, 31, pinion carrier 23, 33, and ring gear 24, 34. Further each sun gear 21, 31 is connected to the rotor output shaft, and each ring gear 24, 34 is fixed to reducer case 25, 35. Furthermore, each pinion carrier 23, 33 is connected to each wheel 27, 37 through each drive shaft 26, 36. Therefore, it becomes possible to easily set the reduction ratio i20 of first planetary gear reduction mechanism 20 and the reduction ratio i30 of second planetary gear reduction mechanism 30, respectively, in response to the output characteristic (high-speed and low-torque characteristic) of inner rotor 12 and the output characteristic (low-speed and high-torque characteristic) of outer rotor 13 since the simple planetary gearset can take a large reduction ratio.

(3) Since the difference (Z24−Z34) of the number Z24 of teeth of ring gear 24 and the number Z34 of teeth of ring gear 34 is set to be greater than 3, it becomes possible to suppress the amplitude of the vibration generating force and the beat phenomenon of gear noise, which are generated from both planetary gear reduction mechanisms 20 and 30. This further improves the quietness of the wheel drive system.

SECOND EMBODIMENT

Figure 3:
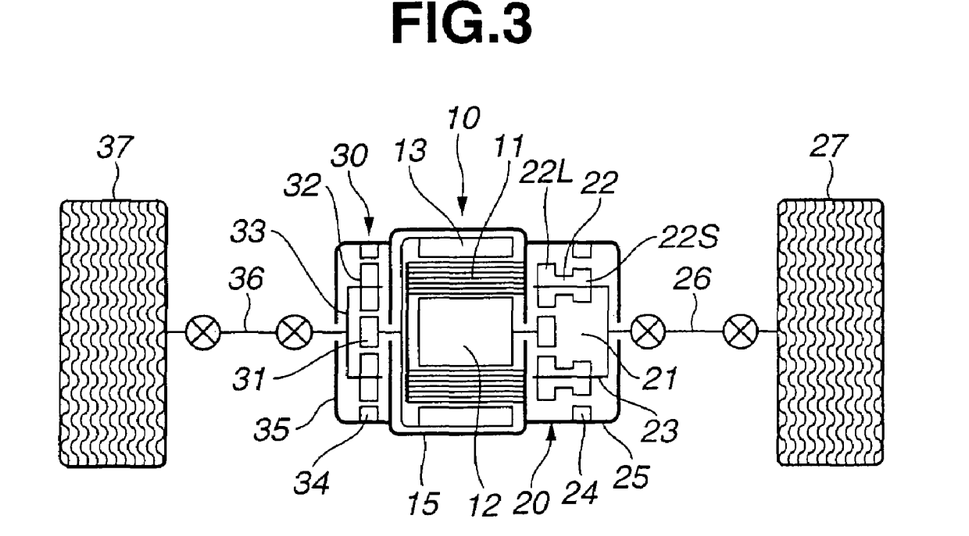
FIG. 3 is a cross-sectional view showing the wheel drive system of a second embodiment.

Referring to FIG. 3, there is discussed a second embodiment of the wheel drive system according to the present invention. The second embodiment is basically the same as the first embodiment except that first planetary gear reduction mechanism 20 is constructed by a compound planetary gearset.

More specifically, as shown in FIG. 3, first planetary gear reduction mechanism 20 is constructed by a compound planetary gearset which comprises stepped pinions each of which is constructed by integrally connecting a large-diameter pinion 22L meshed with a sun gear 21 and a small-diameter pinion 22S meshed with a ring gear 24. Second planetary gear reduction mechanism 30 employed in the second embodiment is the same as that of the first embodiment. That is, second planetary gear reduction mechanism 30 of the second embodiment is constructed by a simple planetary gearset which comprises a sun gear 31, a pinion carrier 33 and a ring gear 34. Ring gears 24 and 34 are fixed to reducer cases 25 and 35, respectively. Pinion carriers 23 and 33 are connected to wheels 27 and 37 through drive shafts 26 and 36, respectively. Since the other constructions of the second embodiment are the same as those of the first embodiment, the other elements are denoted by the same references of the first embodiment, and the explanation thereof is omitted herein.

Subsequently, there is discussed the manner of operation of the wheel drive system of the second embodiment according to the present invention. When gears 21, 24, 22L and 22S is set such the number of teeth of sun gear 21 is Z21, the number of teeth of ring gear 24 is Z24, the number of teeth of large diameter pinion 22L is Z22L and the number of teeth of small diameter pinion 22S is Z22S, the reduction ratio i20 of first planetary gear reduction mechanism 20 having stepped pinions 22 is obtained from the following expression (3).

$$i20=1+i0 \text{ where } i0=(Z22L\cdot Z24)/(Z22S\cdot Z21). \quad (3)$$

As is apparent from the expression (3), first planetary gear reduction mechanism 20 of the second embodiment according to the present invention can obtain a large reduction ratio as compared with that of the first embodiment while maintaining the size thereof.

Subsequently there is discussed the advantage of the second embodiment. The wheel drive system of the second embodiment according to the present invention can gain the following advantage (4) in addition to the advantages (1) and (3) of the first embodiment.

(4) The second embodiment according to the present invention is arranged such that first planetary gear reduction mechanism 20 is constructed by a compound planetary gearset which comprises stepped pinions 22 each of which is constructed by integrally connecting large-diameter pinion 22L meshed with sun gear 21 and small-diameter pinion 22S meshed with ring gear 24 and that second planetary gear reduction mechanism 30 of the second embodiment is constructed by a simple planetary gearset which constructed by sun gear 31, pinion carrier 33 and ring gear 34 and that sun gears 21 and 31 are connected to the respective rotor output shafts, ring gears 24 and 34 are fixed to the respective reducer cases 25 and 35, and pinion carriers 23 and 33 are connected to wheels 27 and 37 through drive shafts 26 and 36, respectively. Therefore, first planetary gear reduction mechanism 20 can obtain the further large reduction ratio i20 as compared with that of the first embodiment. This first planetary gear reduction mechanism 20 is effectively applicable to a high-speed type motor.

THIRD EMBODIMENT

Figure 4:
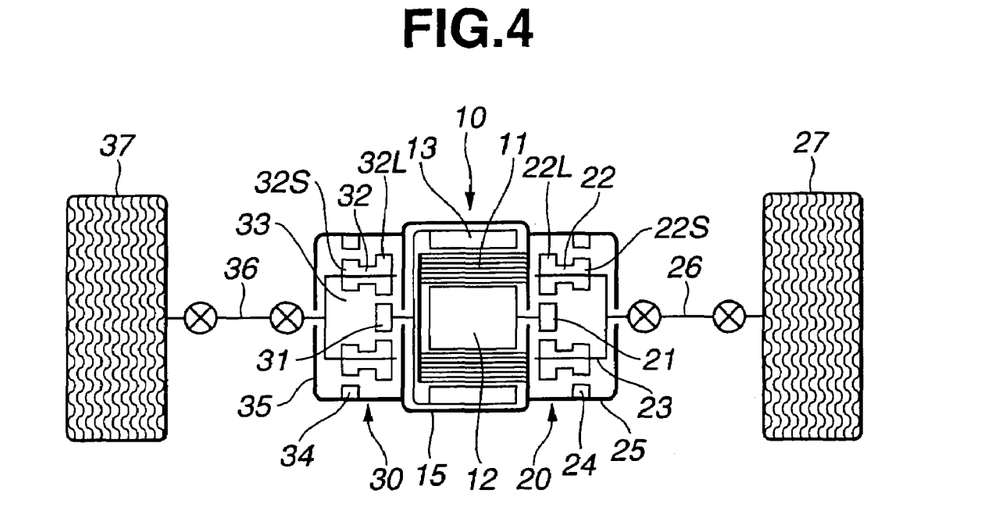
FIG. 4 is a cross-sectional view showing the wheel drive system of a third embodiment.

There is discussed a third embodiment of the wheel drive system according to the present invention with reference to FIG. 4. The third embodiment is arranged such that both of first and second planetary gear reduction mechanisms 20 and 30 are constructed by compound planetary gearsets each of which comprises stepped pinions 22, 23.

More specifically, as shown in FIG. 4, each of first and second planetary gear reduction mechanisms 20 and 30 is constructed by a compound planetary gearset which comprises stepped pinions 22, 32 each of which is constructed by integrating large-diameter pinion 22L, 32L meshed with sun gear 21, 31 and small-diameter pinion 22S, 32S meshed with ring gear 24, 34. Sun gears 21 and 31 are connected to the output shafts, respectively. Ring gears 24 and 34 are fixed to reducer cases 25 and 35, respectively. Pinion carriers 23 and 33 are connected to wheels 27 and 37 through drive shafts 26 and 36, respectively. Since the other constructions of the third embodiment are the same as those of the first embodiment, the other elements are denoted by the same reference of the first embodiment, and the explanation thereof is omitted herein.

Subsequently, there is discussed the manner of operation of the wheel drive system of the third embodiment according to the present invention. Since first and second planetary gear reduction mechanisms 20 and 30 are constructed by compound planetary gearsets respectively having stepped pinions 22 and 32, it becomes possible that both of first and second planetary gear reduction mechanisms 20 and 30 of the third embodiment can have further large reduction ratios i20 and i30 as compared with both planetary gear reduction mechanisms 20 and 30 of the first embodiments and second planetary gear reduction mechanism 20 of the second embodiment.

Subsequently there is discussed the advantage of the third embodiment. The wheel drive system of the third embodiment according to the present invention can gain the following advantage (5) in addition to the advantages (1) and (3) of the first embodiment.

(5) The third embodiment according to the present invention is arranged such that first and second planetary gear reduction mechanisms 20 and 30 are constructed respectively by compound planetary gearsets which respectively comprise stepped pinions 22 each of which is constructed by integrally connecting large-diameter pinion 22L meshed with sun gear 21 and small-diameter pinion 22S meshed with ring gear 24. Therefore, first and second planetary gear reduction mechanisms 20 and 30 can obtain the large reduction ratios i20 and i30. These first and second planetary gear reduction mechanisms 20 and 30 are effectively applicable to a high-speed type motor.

FOURTH EMBODIMENT

Figure 5:
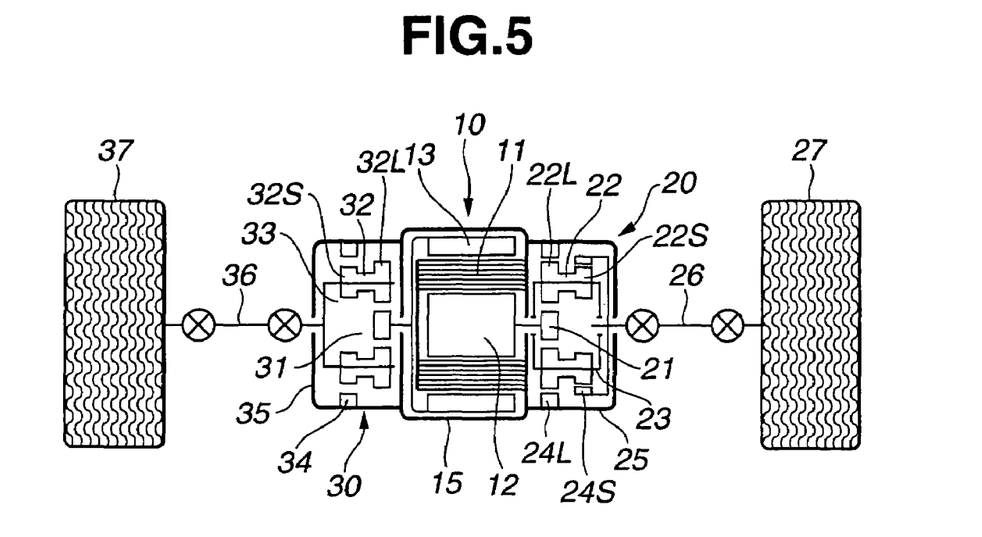
FIG. 5 is a cross-sectional view showing the wheel drive system of a fourth embodiment.

There is discussed a fourth embodiment of the wheel drive system according to the present invention with reference to FIG. 5. The fourth embodiment is arranged such that first planetary gear reduction mechanism 20 is constructed by a compound planetary gearset which is arranged such that a ring gear functions as an output.

More specifically, as shown in FIG. 5, first planetary gear reduction mechanism 20 is constructed by a compound planetary gearset. The compound planetary gearset comprises stepped pinions 22 each of which is constructed by integrating large-diameter pinion 22L meshed with a sun gear 21 and a first ring gear 24L and a small-diameter pinion 22S meshed with a second ring gear 24S. Sun gear 21 is connected to an output shaft of inner rotor 12, first ring gear 24L is fixed to reducer case 25, and second ring gear 24S is connected to wheel 27 through a first drive shaft 26. Since the construction of second planetary gear reduction mechanism 30 of the fourth embodiment is the same as that of second planetary gear reduction mechanism 30 of the third embodiment and the other constructions of the fourth embodiment are the same as those of the first embodiment, the other elements are denoted by the same reference of the first embodiment, and the explanation thereof is omitted herein.

Subsequently, there is discussed the manner of operation of the wheel drive system of the fourth embodiment according to the present invention. When gears 24L, 24S, 22L and 22S are set such that the number of teeth of first ring gear 24L is Z24L, the number of teeth of second ring gear 24S is Z24S, the number of teeth of large-diameter pinion 22L is Z22L and the number of teeth of small-diameter pinion 22S is Z22S, the reduction ratio i20 of first planetary gear reduction mechanism 20 is expressed by the following expression (4).

$$i20=(io'+io')/(io'-1) \text{ where } io=Z24L/Z21>1, io'=(Z22L\cdot Z24S)/(Z24L\cdot Z22S)>1, \text{ and } io''=io\cdot io'>1. \quad (4)$$

As is apparent from the expression (4), the reduction ratio i20 of first planetary gear reduction mechanism 20 of the fourth embodiment can be set at a further large reduction ratio as compared with first planetary gear reduction mechanism 20 of the second or third embodiment.

Subsequently, there is discussed the advantage of the fourth embodiment according to the present invention. The wheel drive system of the fourth embodiment according to the present invention can gain the following advantage (6) in addition to the advantages (1) and (3) of the first embodiment.

(6) The fourth embodiment according to the present invention is arranged such that first planetary gear reduction mechanism 20 is constructed by a compound planetary gearset which comprises stepped pinions 22, each of which is constructed by integrally connecting large-diameter pinion 22L meshed with sun gear 21 and first ring gear 24L and small-diameter pinion 22S meshed with second ring gear 24S. Sun gear 21 is connected to an output shaft of inner rotor 12, first ring gear 24L is fixed to reducer case 25, and second ring gear 24S is connected to wheel 27 through first drive shaft 26. Therefore, first planetary gear reduction mechanism 20 can have the large reduction ratio i20 which is larger than those of first planetary gear reduction mechanisms 20 of the first, second and third embodiments. This first planetary gear reduction mechanisms 20 of the fourth embodiment is effectively applicable to a high-speed type motor.

FIFTH EMBODIMENT

Figure 6:
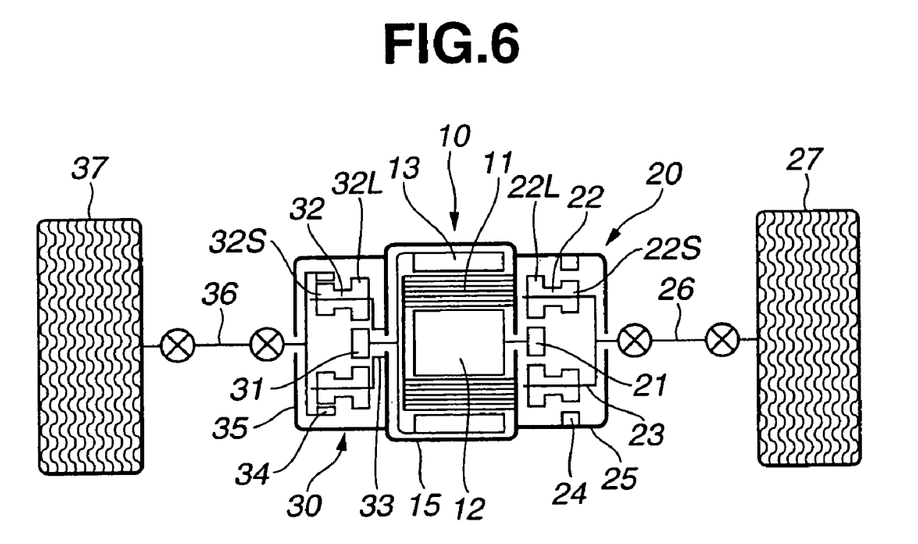
FIG. 6 is a cross-sectional view showing the right and left wheel independent drive system of a fifth embodiment.

There is discussed a fifth embodiment of the wheel drive system according to the present invention with reference to FIG. 6. The fifth embodiment is arranged such that second planetary gear reduction mechanism 30 is constructed by a compound planetary gearset which is arranged such that a ring gear 34 functions as an output.

More specifically, as shown in FIG. 6, second planetary gear reduction mechanism 30 is constructed by a compound planetary gearset which comprises stepped pinions 32 each of which is constructed by integrating large-diameter pinion 32L meshed with sun gear 31 and small-diameter pinions 32S meshed with ring gear 34, pinion carrier 33 is fixed to motor case 15, and ring gear 34 is connected to wheel 37 through second drive shaft 36. Since the construction of first planetary gear reduction mechanism 20 of the fifth embodiment is the same as that of first planetary gear reduction mechanism 20 of the second or third embodiment and the other constructions of the fifth embodiment are the same as those of the first embodiment, the other elements are denoted by the same reference of the first embodiment, and the explanation thereof is omitted herein.

Subsequently, there is discussed the manner of operation of the wheel drive system of the fifth embodiment according to the present invention. Since second planetary gear reduction mechanism 30 of the fifth embodiment is arranged such that pinion carrier 33 is fixed to motor case 15 and that ring gear 34 is connected to wheel 37 through drive shaft 36, the output of outer rotor 13 is inversely rotated and transmitted to wheel 37. Accordingly, it is necessary to rotate inner and outer rotors 12 and 13 inversely with each other in order to rotate right and left wheels 27 and 37 in the same direction. By this arrangement of the fifth embodiment, the reaction force of inner rotor 12 applied to stator 11 has a direction opposite to the direction of the reaction force of outer rotor 13, and therefore the force applied to stator 11 is reduced.

Second planetary gear reduction mechanism 30 discussed in the first through fourth embodiments shown in FIGS. 2 through 5 may be arranged such that the output shaft of outer rotor 13 is connected to sun gear 31, carrier 33 is fixed to motor case 15, and ring gear 34 is connected to wheel 37 through drive shaft 36 as discussed in the fifth embodiment, although they are not shown in the drawings. Such modified arrangements of the first through fourth embodiments also have the advantages obtained by the fifth embodiment.

For example, in case that the idea of second planetary gearset reduction mechanism 30 of the fifth embodiment is applied to second planetary gearset reduction mechanisms (simple planetary gearsets) 30 shown in FIGS. 2 and 3 as discussed above, when gears 31 and 34 thereof are set such that the number of teeth of sun gear 31 is Z31 and the number of teeth of ring gear 34 is Z34, the reduction ratio i30 of such arranged second planetary gear reduction mechanism 30 using the idea of the fifth embodiment is given by the following expression (5).

$$i30=-(1/\lambda 30) \text{ where } \lambda 30=Z31/Z34. \quad (5)$$

On the other hand, when gears 31, 34, 32L and 32S of the fifth embodiment are set such that the number of teeth of sun gear 31 is Z31, the number of teeth of ring gear 34 is Z34, the number of teeth of large-diameter pinion 32L is Z32L and the number of teeth of small-diameter pinion 32S is Z32S, the reduction ratio i30 of second planetary gear reduction mechanism 30 of the fifth embodiment is given by the following expression (6).

$$i30=-io \text{ where } io=(Z32L\cdot Z34)/(Z32S\cdot Z31). \quad (6)$$

From the comparison of the expressions (5) and (6) with the expressions (2) and (3), it has been found that second planetary gear reduction mechanism 30 of the fifth embodiment can further decrease the reduction ratio i30 as compared with that of second planetary gear reduction mechanism 30 employed in the first, second, third or fourth embodiment. Therefore, the fifth embodiment gains the advantage that it becomes easy to have a difference between the reduction ratio i30 of second planetary gear reduction mechanism 30 relative to the reduction ratio i20 of first planetary gear reduction mechanism 20.

Subsequently, there is discussed the advantage of the fifth embodiment according to the present invention. The wheel drive system of the fifth embodiment according to the present invention can gain the following advantage (7) in addition to the advantages (1) and (3) of the first embodiment.

(7) The fifth embodiment according to the present invention is arranged such that second planetary gear reduction mechanism 30 is constructed by a compound planetary gear gearset which comprises stepped pinions 32 each of which is constructed by integrally connecting large-diameter pinion 32L meshed with sun gear 31 and small-diameter pinion 32S meshed with ring gear 34, and that sun gear 31 is connected to an output shaft of outer rotor 13, pinion carrier 33 is fixed to motor case 15, and ring gear 34 is connected to wheel 37 through second drive shaft 36. Therefore, second planetary gear reduction mechanism 30 can reduce the force applied to stator 11 since it is necessary to rotate inner and outer rotors 12 and 13 in the opposite directions due to the arrangement of the fifth embodiment. Further, the fifth embodiment gains the advantage that it becomes easy to make a difference between the reduction ratio i20 of first planetary gear reduction mechanism 20 for inner rotor 12 and the reduction ratio i30 of second planetary gear reduction mechanism 30 for outer rotor 13.

SIXTH EMBODIMENT

Figure 7:
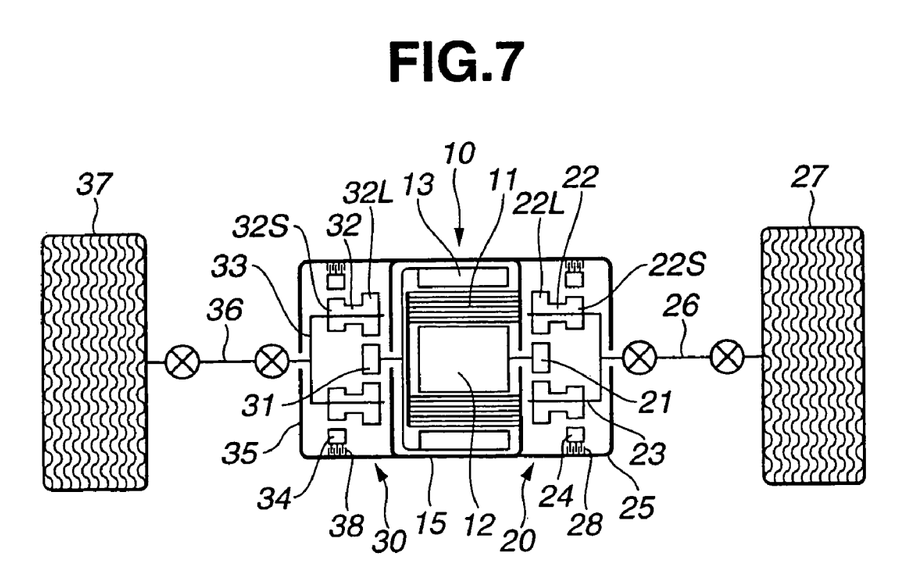
FIG. 7 is a cross-sectional view showing the wheel drive system of a sixth embodiment.

There is discussed a sixth embodiment of the wheel drive system according to the present invention with reference to FIG. 7. The sixth embodiment is arranged such that brake mechanisms are provided between first planetary gear reduction mechanism 20 and reducer case 25 and between second planetary gear reduction mechanism 30 and reducer case 35, respectively.

More specifically, as shown in FIG. 7, brake mechanisms 28 and 38 are respectively disposed so that ring gears 24 and 34 are releasable from reducer cases 25 and 35. In other words, brake mechanisms 28 and 38 are added to the structure of the third embodiment so as to engage and disengage ring gears 24 and 34, respectively. Brake mechanisms 28 and 38 are of a hydraulic and multi-plate type. Herein, in case that carrier 33 is fixed to reducer case 35 as is similar to the fifth embodiment shown in FIG. 6, a brake mechanism is disposed between carrier 33 and motor case 15 although it is not shown. Since the other constructions of the sixth embodiment are the same as those of the third embodiment, the other elements are denoted by the same reference of the third embodiment, and the explanation thereof is omitted herein.

Subsequently, there is discussed the advantages of the sixth embodiment. The wheel drive system of the sixth embodiment according to the present invention can gain the following advantage (8) in addition to the advantages gained by the first through fifth embodiments.

(8) The sixth embodiment according to the present invention is arranged such that brake mechanisms 28 and 38 are provided so as to engage and disengage ring gears 24 and 34 of first and second planetary gear reduction mechanisms 20 and 30 relative to reducer cases 25 and 35, respectively. Therefore, by putting brake mechanisms 28 and 38 in the disengaged state when it is not necessary to utilize the regenerative braking, it becomes possible to suppress heat producing of both planetary gear reduction mechanisms 20 and 30. This improves the durability of both planetary gear reduction mechanisms 20 and 30.

Although the invention has been described above by reference to the first to sixth embodiments of the wheel drive system according to the invention, concrete construction of the system is not limited to these embodiments. The change and addition in design may be allowed as far as they do not deviate from the invention defined by the claims.

For example, although the wheel drive system according to the present invention has been shown in the first to sixth embodiments, an optimum construction may be selected according to the required characteristics of a vehicle and an output characteristics of a motor. Although the coaxial three-layer motor has been shown and described such that an inner rotor is disposed inside of a stator and an outer rotor is disposed outside the stator, it may be arranged such that the stator is disposed at an innermost position and the inner and outer rotors are disposed outside the stator, or such that the stator is disposed at an outermost position and the inner and outer rotors are disposed inside the stator.

Although the first to sixth embodiments have been shown and described such that the wheel drive system according to the present invention is adapted to a fuel cell vehicle, it will be understood that the wheel drive system according to the present invention may be adapted to an electric vehicle. Further, although the first to sixth embodiments have been shown and described such that the wheel drive system according to the present invention is installed between the front right and left wheels and between the rear right and left wheels, the wheel drive system may be installed only between the front right and left wheels or only between the rear right and left wheels. Furthermore, the wheel drive system according to the present invention may be adapted to a motor four wheel drive vehicle in which front wheels or rear wheels are driven by an internal combustion engine, and the other of the rear wheels or the front wheels are driven by a motor.

This application is based on Japanese Patent Application No. 2003-353200 filed on Oct. 14, 2003 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A wheel drive system for independently driving right and left wheels of a vehicle, the wheel drive system being disposed between the right and left wheels of the vehicle, the wheel drive system comprising:
   a coaxial three-layer motor comprising an inner rotor, an outer rotor and a stator which are coaxially arranged, the coaxial three-layer motor being housed in a motor case;
   a first planetary gear reduction mechanism whose input is connected to the inner rotor, and whose output is connected to a first drive shaft of one of the right and left wheels; and
   a second planetary gear reduction mechanism whose input is connected to the outer rotor and whose output is connected to a second drive shaft of the other of the right and left wheels, a reduction ratio of the first planetary gear reduction mechanism being greater than a reduction ratio of the second planetary gear reduction mechanisms,
   wherein both the first and second planetary gear reduction mechanisms are of a single pinion type.

2. The wheel drive system as claimed in claim 1, wherein each of the first and second planetary gear reduction mechanisms is constructed by a planetary gearset which comprises a sun gear, a pinion carrier and a ring gear, wherein each sun gear is respectively connected to a rotor output shaft of one of the inner and outer rotors, each ring gear is respectively fixed to a reducer case, and each pinion carrier is respectively connected to one of the right and left wheels through one of the first and second drive shafts.

3. The wheel drive system as claimed in claim 2, wherein the first planetary gear reduction mechanism is a compound planetary gearset which comprises stepped pinions each of which is formed by integrating a large-diameter pinion meshed with the sun gear of the first planetary gear reduction mechanism and a small-diameter pinion meshed with the ring gear of the first planetary gear reduction mechanism, and wherein the second planetary gear reduction mechanism is a simple planetary gearset, wherein the sun gear of the second planetary gear reduction mechanism is connected to the rotor output shaft of the outer rotor, the ring gear of the second planetary gear reduction mechanism is fixed to a reducer case, and the pinion carrier of the secondary planetary gear reduction mechanism is connected to one of the right and left wheels through the second drive shaft.

4. The wheel drive system as claimed in claim 2, wherein both of the first and second planetary gear reduction mechanisms are respectively constructed by compound planetary gearsets each of which comprises stepped pinions each of which is formed by integrating a large-diameter pinion meshed with the sun gear of the stepped pinion's respective planetary gear reduction mechanism and a small-diameter pinion meshed with the ring gear of the stepped pinion's respective planetary gear reduction mechanism.

5. The wheel drive system as claimed in claim 1, wherein a difference between a number of teeth of a ring gear of the first planetary gear reduction mechanism and a number of teeth of a ring gear of the second planetary gear reduction mechanism is greater than or equal to 3.

6. The wheel drive system as claimed in claim 1, wherein the first planetary gear reduction mechanism is constructed by a compound planetary gearset which comprises stepped pinions each of which is formed by integrating a large-diameter pinion meshed with a sun gear and a first ring gear and a small-diameter pinion meshed with a second ring gear, wherein the sun gear is connected to a rotor output shaft, the first ring gear is fixed to a reducer case, and the second ring gear is connected to one of the right and left wheels through the first drive shaft.

7. The wheel drive system as claimed in claim 1, wherein the second planetary gear reduction mechanism is constructed by a compound planetary gearset which comprises a sun gear, a pinion carrier and a ring gear, wherein the sun gear is connected to an outer rotor output shaft, the pinion carrier is fixed to the motor case, and the ring gear is connected to one of the right and left wheels through the second drive shaft.

8. The wheel drive system as claimed in claim 1, wherein the second planetary gear reduction mechanism is a compound planetary gearset which comprises stepped pinions each of which is formed by integrating a large-diameter pinion meshed with a sun gear and a smaller-diameter pinion meshed with a ring gear.

9. The wheel drive system as claimed in claim 1, further comprising brake mechanisms for fixing and releasing fixing elements of the first and second planetary gear reduction mechanisms relative to a reducer case, respectively.

* * * * *